US009575741B2

(12) United States Patent
Chinnappan et al.

(10) Patent No.: US 9,575,741 B2
(45) Date of Patent: Feb. 21, 2017

(54) METHODS AND DEVICES FOR WIRELESS DEVICE-TO-DEVICE SOFTWARE UPGRADES

(71) Applicant: Motorola Mobility LLC, Chicago, IL (US)

(72) Inventors: Sateshk Kumar Chinnappan, Neyveli (IN); Vinay Basavanna, Bangalore (IN); Gopalakrishnan Venkatasubramanian, Bangalore (IN)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 12 days.

(21) Appl. No.: 14/453,923

(22) Filed: Aug. 7, 2014

(65) Prior Publication Data
US 2015/0268944 A1    Sep. 24, 2015

Related U.S. Application Data

(60) Provisional application No. 61/968,086, filed on Mar. 20, 2014.

(51) Int. Cl.
*G06F 9/44*      (2006.01)
*G06F 9/445*     (2006.01)

(52) U.S. Cl.
CPC ..................... *G06F 8/65* (2013.01)

(58) Field of Classification Search
CPC ........................................... G06F 8/65
USPC ................. 717/173, 169, 171, 172
See application file for complete search history.

(56) References Cited

U.S. PATENT DOCUMENTS

| 7,162,538 | B1 * | 1/2007 | Cordova | G06F 8/61 709/238 |
| 7,584,261 | B1 * | 9/2009 | Teodosiu | G06F 8/60 709/217 |
| 7,779,409 | B2 * | 8/2010 | Persson | G06F 8/61 717/178 |
| 8,402,455 | B2 * | 3/2013 | Seal | G06F 8/60 717/171 |
| 2004/0006586 | A1 * | 1/2004 | Melchione | G06F 8/61 709/201 |

(Continued)

FOREIGN PATENT DOCUMENTS

EP    2333667 A1 *   6/2011   ............... G06F 8/63

*Primary Examiner* — Abdullah Al Kawsar
*Assistant Examiner* — Hossain Morshed
(74) *Attorney, Agent, or Firm* — Morris & Kamlay LLP

(57) ABSTRACT

Disclosed herein are methods and devices for wireless device-to-device software upgrade. In one implementation, a source electronic device receives software version information from a target electronic device. The source electronic device transmits software version information of the source electronic device and software version information of the target electronic device to a server. The source electronic device receives, from the server, a notification that the source electronic device is permitted to upgrade the target electronic device. The source electronic device then establishes a wireless connection with the target electronic device. Next, the source electronic device receives, from the target electronic device, information regarding a software upgrade that is needed by the target electronic device. The source electronic device then wirelessly transmits the software upgrade to the target electronic device.

20 Claims, 5 Drawing Sheets

(56) References Cited

U.S. PATENT DOCUMENTS

| | | | | |
|---|---|---|---|---|
| 2004/0019889 A1* | 1/2004 | Melchione | H04L 67/34 | 717/177 |
| 2004/0261071 A1* | 12/2004 | Chuang | G06F 8/65 | 717/170 |
| 2005/0071481 A1* | 3/2005 | Danieli | A63F 13/12 | 709/229 |
| 2005/0114852 A1* | 5/2005 | Chen | G06F 11/1433 | 717/168 |
| 2005/0138128 A1* | 6/2005 | Baniel | H04L 12/581 | 709/206 |
| 2006/0143431 A1* | 6/2006 | Rothman | G06F 11/1417 | 713/2 |
| 2008/0133650 A1* | 6/2008 | Saarimaki | G06F 8/65 | 709/203 |
| 2008/0195868 A1* | 8/2008 | Asokan | G06F 21/64 | 713/176 |
| 2008/0209414 A1* | 8/2008 | Stein | G06F 8/65 | 717/173 |
| 2009/0182815 A1* | 7/2009 | Czechowski, III | H04L 67/104 | 709/206 |
| 2009/0217256 A1* | 8/2009 | Kim | G06F 11/1433 | 717/168 |
| 2010/0333080 A1* | 12/2010 | Keys | G06F 8/68 | 717/171 |
| 2011/0078239 A1* | 3/2011 | Heen | G06F 8/65 | 709/203 |
| 2011/0111743 A1* | 5/2011 | Boukai | G06F 8/61 | 455/419 |
| 2011/0143661 A1* | 6/2011 | Hartwig | G06F 8/65 | 455/41.1 |
| 2012/0036220 A1* | 2/2012 | Dare | G06F 8/61 | 709/217 |
| 2012/0054875 A1* | 3/2012 | Antill | G06F 21/10 | 726/28 |
| 2013/0019238 A1* | 1/2013 | Choe | G06F 21/57 | 717/173 |
| 2013/0125107 A1* | 5/2013 | Bandakka | G06F 8/665 | 717/171 |
| 2013/0125225 A1* | 5/2013 | Candelore | G06F 21/445 | 726/7 |
| 2013/0127980 A1* | 5/2013 | Haddick | G06F 3/013 | 348/14.08 |
| 2013/0278631 A1* | 10/2013 | Border | G02B 27/017 | 345/633 |
| 2014/0033193 A1* | 1/2014 | Palaniappan | G06F 8/65 | 7/173 |
| 2014/0057620 A1* | 2/2014 | Lin | G06F 8/65 | 455/418 |
| 2014/0156742 A1* | 6/2014 | Liu | H04L 67/42 | 709/203 |
| 2014/0207844 A1* | 7/2014 | Mayo | H04L 67/34 | 709/203 |
| 2014/0310702 A1* | 10/2014 | Ricci | H04W 48/04 | 7/173 |
| 2014/0379801 A1* | 12/2014 | Gupta | H04L 67/306 | 709/204 |
| 2015/0113587 A1* | 4/2015 | Gautam | G06F 21/57 | 726/1 |

* cited by examiner

METHODS AND DEVICES FOR WIRELESS DEVICE-TO-DEVICE SOFTWARE UPGRADES

CROSS-REFERENCE TO RELATED APPLICATIONS

The present application claims priority to U.S. Provisional Patent Application No. 61/968,086, filed Mar. 20, 2014, the contents of which are incorporated herein by reference.

TECHNICAL FIELD

The present disclosure is related generally to methods and devices for transmitting and receiving software upgrades and, more particularly, to methods and devices for wireless device-to-device software upgrades.

BACKGROUND

Traditional software upgrades on mobile devices are typically performed through an Over the Air ("OTA") mechanism. The OTA upgrade mechanism requires a large infrastructure and network. The OTA upgrade mechanism places limitations on the number of devices that can be upgraded at once, and thus software upgrades are allowed only in batches. Performance of the software upgrades through OTA mechanism depends on the speed of the data connection available to the device and user. For devices and users with moderate data speeds, this can result in an inordinately long upgrade process. Depending on the reliability of the data connection available, OTA software upgrades may be frequently interrupted. Furthermore, OTA software upgrades may require a device to download over 250 MB of data. This results in significant bandwidth cost to the user when the OTA software upgrade is downloaded through existing 3G or 4G cellular data connection.

The traditional software upgrade process also presents issues for the engineering community or the developer community. Typically, traditional software upgrade process performed by the engineering community involves downloading a 400-600 MB file from a server to a device. After upgrading the software of the device, a user would be required to set non-volatile memory items and operating system ("OS") properties, each of which requires a reboot of the device. These operations are time consuming and require the device to restart every time these settings are changed. Furthermore, traditional software upgrade process used by the engineering community often requires extra accessories, such as computers or USB cables. To test a feature that may be under development, engineering users or developers are often required to make many customizations to the devices, such as setting different flex items, OS properties, or pushing binaries to the mobile devices. These customizations in turn involve a lot of manual effort and time to replicate on a different mobile device.

BRIEF DESCRIPTION OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
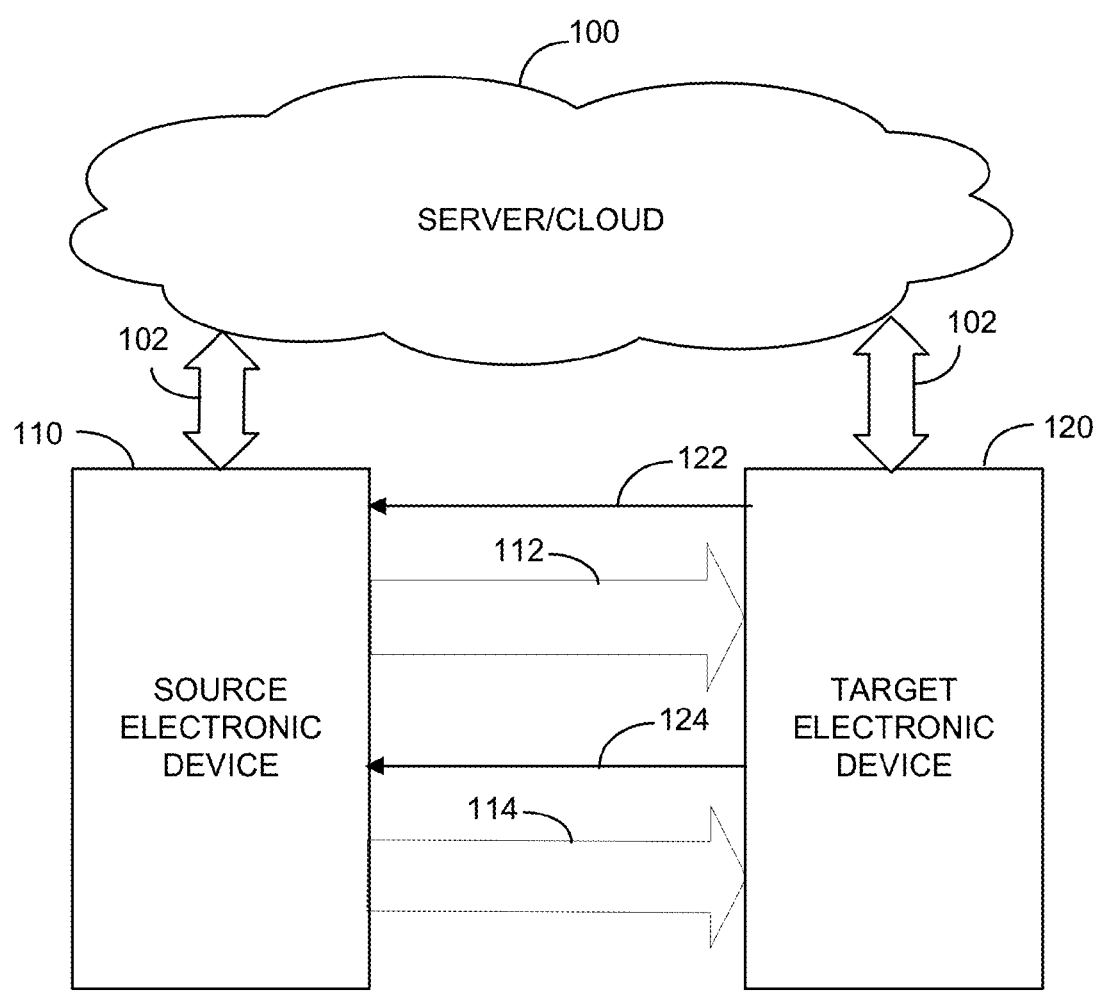
FIG. 1 is an overview of a representative communication system in which the methods of this disclosure may be practiced.

Turning to the drawings wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

In an embodiment, a method is carried out by a source electronic device. The source electronic device receives software version information from a target electronic device. The source electronic device then transmits software version information of the source electronic device and software version information of the target electronic device to a server. The source electronic device receives, from the server, a notification that the source electronic device is permitted to upgrade the target electronic device. Next, the source electronic device establishes a wireless connection with the target electronic device. The source electronic device receives, from the target electronic device, information regarding a software upgrade that is needed by the target electronic device. The source electronic device then wirelessly transmits the software upgrade to the target electronic device.

In another embodiment, a method is carried out in a target electronic device. The target electronic device transmits software version information to a source electronic device. The target electronic device receives, from a server, a notification that the source electronic device is permitted to upgrade the target electronic device. Next, the target electronic device establishes a wireless connection with the source electronic device. The target electronic device generates information regarding a software upgrade that is needed by the target electronic device, and transmits the generated information regarding the software upgrade to the source electronic device. Then, the target electronic device receives the software upgrade from the source electronic device.

In yet another embodiment, a source electronic device includes a processor, a memory, and a transceiver, where the components are communicatively coupled to one another. The memory is configured to store software version information of the source electronic device. The processor is configured to control the transceiver to communicate with a target electronic device and a server. The transceiver receives software version information from the target electronic device. The transceiver transmits software version information of the source electronic device and software version information of the target electronic device to the server. The transceiver receives, from the server, a notification In yet another embodiment, a target electronic device includes a processor, a memory, and a transceiver, where the components are communicatively coupled to one another. The memory is configured to store software version information of the target electronic device. The processor is configured to control the transceiver to communicate with a source electronic device and a server. The transceiver transmits the software version information to the source electronic device. The transceiver receives, from the server, a notification that the source electronic device is permitted to upgrade the target electronic device. The transceiver then establishes a wireless connection with the source electronic device. The transceiver transmits, to the source electronic device, information regarding software upgrade that is needed by the target electronic device. The transceiver then receives the software upgrade from the source electronic device.

FIG. 1 is an overview of a representative communication system in which the methods of this disclosure may be practiced. The communication system includes a server 100 (e.g., a cloud server), a source electronic device 110, and a target electronic device 120. The software of the target electronic device 120 is upgraded using the source electronic device 110, which contains already upgraded software. The source electronic device 110 and the target electronic device 120 first establish contact with back-end services in the server 100. The server 100 verifies whether the source electronic device 110 and the target electronic device 120 are eligible to participate in the software upgrade at the beginning of the upgrade process. The communication system also ensures that the status of the upgrade process is transmitted to the server 100 at the end of the upgrade process. Based on differences between the software contained in the source electronic device 110 and the target electronic device 120, software upgrade images are generated by the source electronic device 110 at the time of the software upgrade process. Then, the source electronic device 110 transfers the software upgrade images to the target electronic device 120 through any Internet Protocol ("IP") based transport medium (e.g., Wi-Fi Direct or Wi-Fi Peer-to-Peer) available between the two devices. Once the target electronic device 120 receives the software upgrade, the software upgrade is validated at the target electronic device 120. The target electronic device 120 then installs the validated software upgrade.

The communication system and device-to-device software upgrade process offer various advantages over traditional OTA software upgrade process. For example, users can upgrade their mobile devices by simply establishing a short range communication link with other devices that already contain upgraded software (e.g., by tapping their mobile devices to kiosks or other mobile devices). Users need not wait for OTA upgrades, and the OTA server load is reduced significantly. For engineering users, the device-to-device software upgrade allows customized build (in addition to regular builds) to be exchanged across engineering users and development teams faster. There is no need to replicate customized settings (e.g., non-volatile memory items, flex items, OS settings) on the newly upgraded device, and no additional accessories are required. For instance, an OTA software upgrade may take about 30-40 minutes to download and about 25 minutes to install. In contrast, the same software upgrade may take only about 5 minutes to download and install via the device-to-device software upgrade process described in the present disclosure.

Referring to FIG. 1, the communication system performs the device-to-device software upgrade process in three phases: preparation phase, transfer phase, and upgrade phase.

Preparation Phase. First, the source electronic device 110 and the target electronic device 120 interact with each other through short range communication or near field communication ("NFC"). In an embodiment, the target electronic device 120 triggers a software upgrade through NFC with the source electronic device 110. Each of the source electronic device 110 and the target electronic device 120 establishes a communication link 102 with the server 100. Through the communication link 102, the source electronic device 110 and the target electronic device 120 communicate with back-end services in the server 100 to determine if software in the source electronic device 110 (already upgraded) is compatible with the target electronic device 120. This interaction with the server 100 establishes security procedures to ensure only valid devices are upgraded. Any unauthorized phones (e.g., rooted devices) may not be allowed to upgrade through this process. After the interaction with the server 100, the source electronic device 110 and the target electronic device 120 exchange information (e.g., media access control ("MAC") address) to establish an IP link between the two devices.

Transfer Phase. Once the server 100 determines that the source electronic device 110 and the target electronic device 120 are compatible, an IP link (e.g., Wi-Fi Direct or Wi-Fi Peer-to-Peer) is established between the devices. The source electronic device 110 and the target electronic device 120 then communicate with each other through the IP link to determine the software upgrade package. The software upgrade package, which is needed by the target electronic device 120, is generated by the source electronic device 110 on the fly (i.e., there is no pre-stored binaries/images of the software upgrade package on source electronic device 110). The source electronic device 110 then transfers the generated software upgrade package to the target electronic device 120. In an embodiment, the partitions needed by the target electronic device 120 are generated at the source electronic device 110 only at the time of the upgrade and removed at the source electronic device 110 as soon the transfer to the target electronic device 120 is completed. Also the patch data may not be fixed (e.g., it may be changed according to the version of the target device). Thus, various embodiments described herein give the flexibility to upgrade from any lower version to a higher version without having to maintain different patch data (or patch identification information).

In more detail, the target electronic device 120 initiates a first request 122 to request software partition headers from the source electronic device 110. The source electronic device 110 then transmits to the target electronic device 120 software partition header contents in a first transmission 112. Next, the target electronic device 120 transmits a second request 124 to request contents of software partitions for the upgrade. Based on the second request 124, the source electronic device 110 transmits the contents of the software partition for the upgrade to the target electronic device 120 in a second transmission 114.

During the device-to-device software upgrade process, a user's personal data, which resides in the data partition of the source electronic device 110, is not transferred to the target electronic device 120. Also, the data partition in the target electronic device 120 is not modified in the upgrade process. This ensures that the software upgrade does not compromise the security of user data in the devices.

Upgrade Phase. Once the target electronic device 120 receives the software update package from the source electronic device 110, the target electronic device 120 validates the received software upgrade package to ensure that the target electronic device 120 is compatible with the received software upgrade. Once the software upgrade process is completed, the target electronic device 120 reboots with the software upgrade (i.e., the same firmware as that of the source electronic device 110).

Optionally, the target electronic device 120 may transmit the status of the software upgrade to the back-end services in the server 100 after installation of the software upgrade. The notification to the server 100 aids in upgrade status reporting and cancelation of unnecessary server-initiated software updates.

Figure 2:
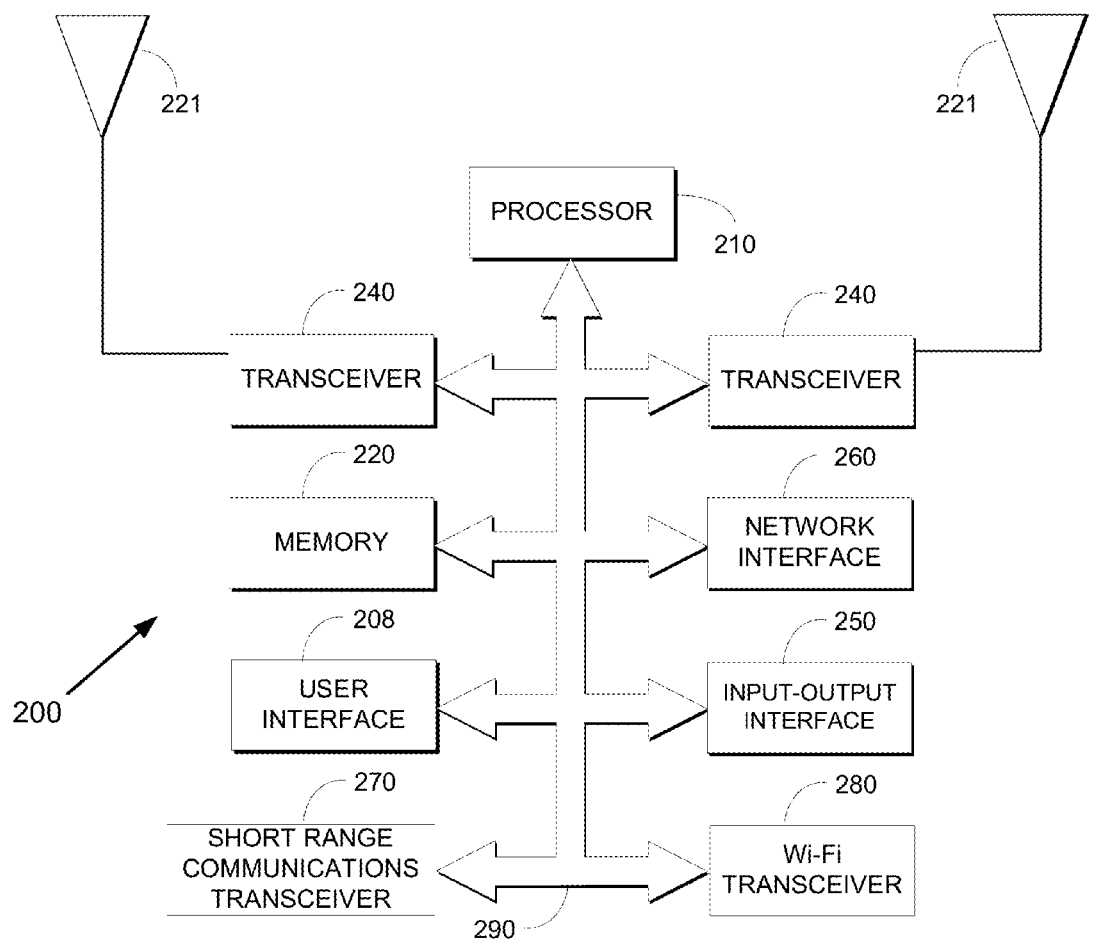
FIG. 2 is a generalized schematic of a representative electronic device.

FIG. 2 illustrates a configuration of an electronic device (e.g., the source electronic device 110 or the target electronic device 120 from FIG. 1), in accordance with an embodiment of the disclosure. The electronic device 200 ("the device 200") includes a user interface 208, a processor 210, a memory 220 (which can be implemented as volatile memory or non-volatile memory), one or more transceivers 240, an input/output ("I/O") interface 250, a network interface 260, one or more antennas 221, a short range communications transceiver 270, and a Wi-Fi transceiver 280. Each of these elements is communicatively linked to one another via one or more data pathways 290.

Possible implementations of the data pathways 290 include wires, conductive pathways on a microchip, and wireless connections. Possible implementations of the processor 210 include a microprocessor and a computer. Possible implementations of the network interface 260 include a modem, a network interface card, and a wireless local area network chipset.

During operation of the device 200, each transceiver 240 receives data from the processor 210 and transmits Radio Frequency ("RF") signals representing the data via an antenna 221 connected to it. Similarly, each transceiver 240 receives RF signals via the antenna 221, converts the signals into the appropriately formatted data, and provides the data to the controller 210. The transceiver 240 may include a cellular transceiver. More particularly, the cellular transceiver is configured to conduct cellular communications, such as 3G, 4G, 4G-LTE, vis-à-vis cell towers (not shown), albeit in other embodiments, the cellular transceiver can be configured to utilize any of a variety of other cellular-based communication technologies such as analog communications (using AMPS), digital communications (using CDMA, TDMA, GSM, iDEN, GPRS, EDGE, etc.), and/or next generation communications (using UMTS, WCDMA, LTE, IEEE 802.16, etc.) or variants thereof.

The short range communications transceiver 270 is configured to conduct non-cellular wireless communications. In various embodiments, the short range communications transceiver 270 may include for example, a wireless transceiver employing ad hoc communication technologies such as HomeRF (radio frequency), Home Node B (3G femtocell), Bluetooth and/or other wireless communication technologies such as infrared technology.

The Wi-Fi transceiver 280 is a wireless local area network (WLAN) transceiver configured to conduct Wi-Fi communications in accordance with the IEEE 802.11 (a, b, g, or n) standard with access points. In other embodiments, the Wi-Fi transceiver 280 can instead (or in addition) conduct other types of communications commonly understood as being encompassed within Wi-Fi communications such as some types of peer-to-peer (e.g., Wi-Fi Peer-to-Peer or Wi-Fi-P2P or WiFi Direct) communications.

The processor 210 retrieves instructions and data from the memory 220 and, using the instructions and data, provides outgoing data to, or receives incoming data from the transceivers 240, the short range communications transceiver 270, and/or the Wi-Fi transceiver 280. The controller 210 also receives data from, and sends data to external devices via the I/O interface 250.

The memory 220 has stored thereon hardware and software information about the device 200. The memory 220 also has stored thereon algorithms, which when executed by the processor 210, perform the methods of the device-to-device software upgrade progress described in the present disclosure.

Figure 3:
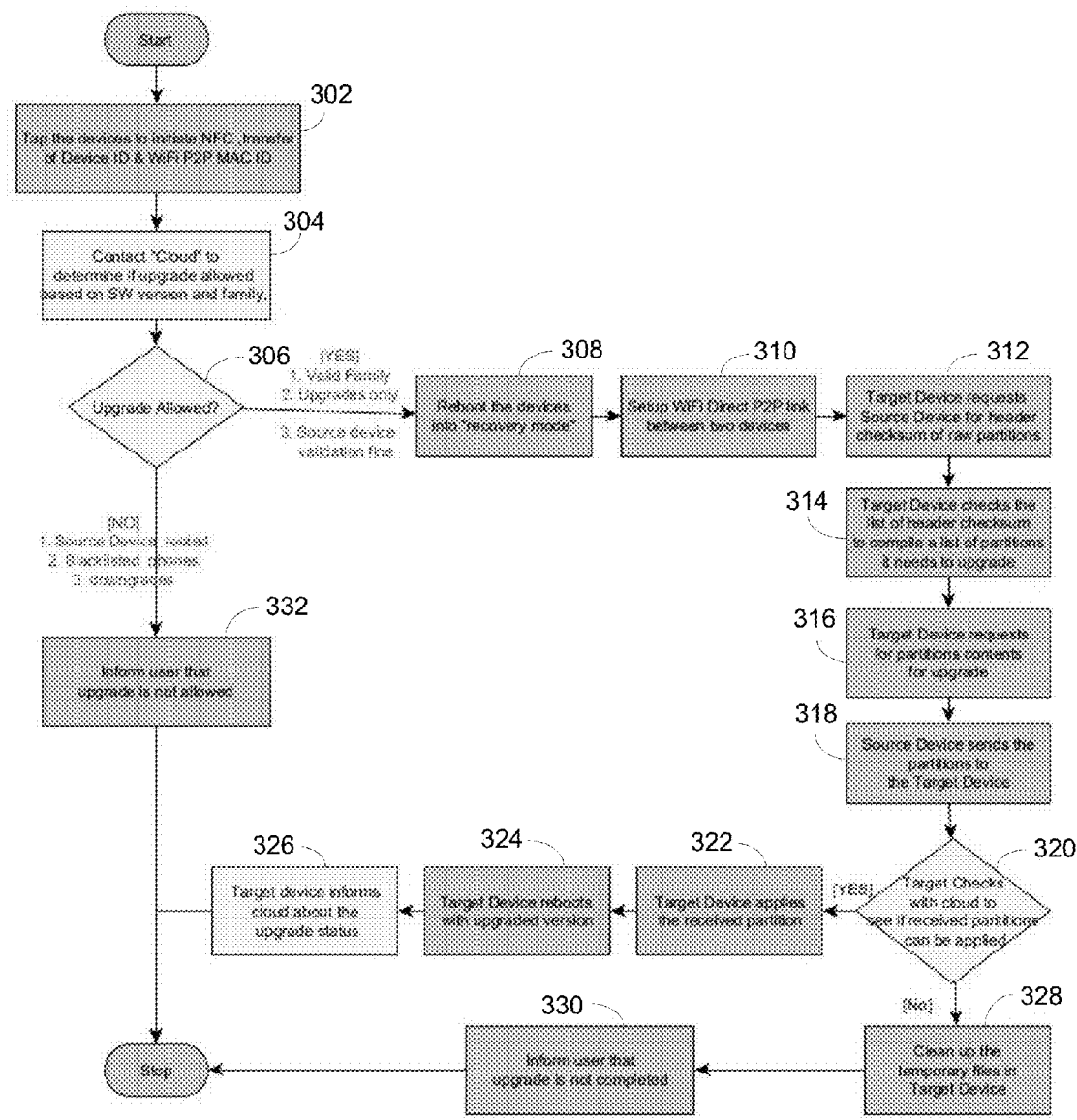
FIG. 3, FIG. 4, and FIG. 5 are flowcharts showing procedures carried out according to embodiments of the disclosure.

FIG. 3 illustrates a device-to-device software upgrade process 300 carried out by a communication system (e.g., the communication system illustrated in FIG. 1), according to an embodiment. At step 302, the source electronic device 110 and the target electronic device 120 establish a NFC link (e.g., by tapping the devices together or by bringing the devices sufficiently close together to establish short range communication). In an embodiment, the target electronic device 120 initiates the NFC request to the source electronic device 110 for a software upgrade. The NFC request may include information about the target electronic device 120, e.g., international mobile station equipment identity ("IMEI"), cloud device identification, Wi-Fi MAC address, and software version information.

At step 304, the source electronic device 110 performs a compatibility check based on the received software version information from the target electronic device 120. The source electronic device 110 then sends the credentials (e.g., software versions and device identifications) of the source electronic device 110 and the target electronic device 120 to the server 100 for validation.

Upon receiving the credentials, at step 306, the server 100 determines whether the source electronic device 110 is permitted to upgrade the software of the target electronic device 120. The server 100 may perform a check for rooted devices and may verify IMEI, device identification integrity, and upgrade path validation. If the server 100 determines that a software upgrade is not permitted between the devices, e.g., the source electronic device 110 or the target electronic device 120 is a rooted device or the software upgrade is actually a software downgrade, the server 100 transmits a notification to the source electronic device 110 and/or the target electronic device 120 that the software upgrade is not allowed at step 332. Then software upgrade process then terminates.

On the other hand, if the server 100 determines that the source electronic device 110 is permitted to upgrade the software of the target electronic device 120 at step 306, the server 100 transmits a notification via push channel to both devices, which will trigger the devices to be rebooted in recovery mode at step 308. In other embodiments, however, one or both of the devices need not be rebooted into recovery mode to proceed with the software upgrade process (i.e., step 308 may be omitted), and the software upgrade may proceed with the devices in normal operation mode.

Next, at step 310, the source electronic device 110 and the target electronic device 120 set up push Wi-Fi firmware with each device's Wi-Fi transceiver to establish Wi-Fi connection. A Wi-Fi-P2P or Wi-Fi Direct link is established between the source electronic device 110 and the target electronic device 120 based on the MAC addresses exchanged using NFC link at step 302. Either the source electronic device 110 or the target electronic device 120 may start the DHCP server as the P2P group owner, and the other device connects to the DHCP server. Once the IP addresses of the source electronic device 110 and the target electronic device 120 are assigned by the DHCP server, a native service is invoked in both the source electronic device 110 and the target electronic device 120.

At step 312, the target electronic device 120 transmits a request to the source electronic device 110 for a header checksum of raw software partitions. The header checksum function or algorithm determines the difference between the software partitions installed in the source electronic device 110 and the software partitions installed in the target electronic device 120. Based on the header checksum result, the source electronic device 110 or the target electronic device 120 may determine which software partitions should be included in the software upgrade. Then at step 314, the target electronic device 120 checks the list of header checksum to compile a list of software partitions that it needs for the software upgrade (i.e., a list of software partitions that are different between the source electronic device and the target electronic device 120). It should be noted that a partition on the source electronic device 110 can have different contents than the same partition on the target electronic device 120, and vice versa.

At step 316, the target electronic device 120 transmits a request to the source electronic device 110 for the content of the software partitions that the target electronic device 120 needs for the software upgrade. Upon receiving the request, the source electronic device 110 transmits the content of the requested software upgrade partitions to the target electronic device 120 at step 318.

After receiving the content of the requested software upgrade partitions, at step 320, the target electronic device 120 establishes communication with the server 100 to determine if the received software upgrade partitions can be applied or installed in the target electronic device 120. If the target electronic device 120 receives from the server 100 a notification that the received software upgrade partitions cannot be installed, then the target electronic device 120 removes the received software upgrade partitions (which are stored as temporary files) at step 328. The target electronic device 120 then outputs a message to inform the user that the software upgrade was not completed at step 330.

On the other hand, if the target electronic device 120 receives from the server 100 a notification that the received software upgrade partitions can be installed, the target electronic device 120 then applies or installs the received software upgrade partitions at step 322. After installation, the target electronic device 120 reboots with the upgraded software at step 324. Then, at step 326, the target electronic device 120 establishes communication with the server 100 and transmits a software update status to the server 100.

In another embodiment, after the update is complete, the target electronic device 120 sets a flag to return to or reboot in normal mode and removes all the software upgrade partitions it had received from the source electronic device 110. As soon as the source electronic device 110 sends the upgrade package, it can reboot itself to its normal mode. Once the target electronic device 120 powers up completely in normal mode, it contacts the server 100 to update its software upgrade status.

Software partitions stored in electronic devices may be divided into two types: monolithic code partitions and file-system partitions. The software partitions inside the source electronic device 110 are handled differently based on the type of the partition.

Transfer of monolithic code partitions. The target electronic device 120 transmits a request to the source electronic device 110 for the partition header checksum/signature from the source electronic device 110. Upon receiving the checksum/signatures from the source electronic device 110, the target electronic device 120 compares the received checksum/signature with the checksum/signature in its own partitions. Based on the comparison results, the target electronic device 120 identifies a list of partitions it needs from the source electronic device 110. After the target electronic device 120 sends the list of partitions to the source electronic device 110, the source electronic device 110 creates a data dump of these partitions from its own firmware partitions (which are live-functioning partitions) and then transmits the newly created partitions to the target electronic device 120 over a secure IP connection. Upon receiving all the requested partitions, the target electronic device 120 applies or installs them using native kernel calls.

Transfer of file-system partitions. Unlike monolithic code partitions, file-system partitions are copied piecewise from the source electronic device 110 to the target electronic device 120. The metadata associated with the structure of the file-system partition (e.g., permissions soft link details) is transferred to mirror the partition in the target electronic device 120 in exactly the same way as it was in the source electronic device 110.

For both types of software partitions, there are no pre-stored packages or images anywhere in the source electronic device 110. The partitions needed by the target electronic device 120 are generated at the source electronic device 110 only at the time of the software upgrade and are removed at the source electronic device 110 as soon the transfer to the target electronic device 120 is completed.

Figure 4:
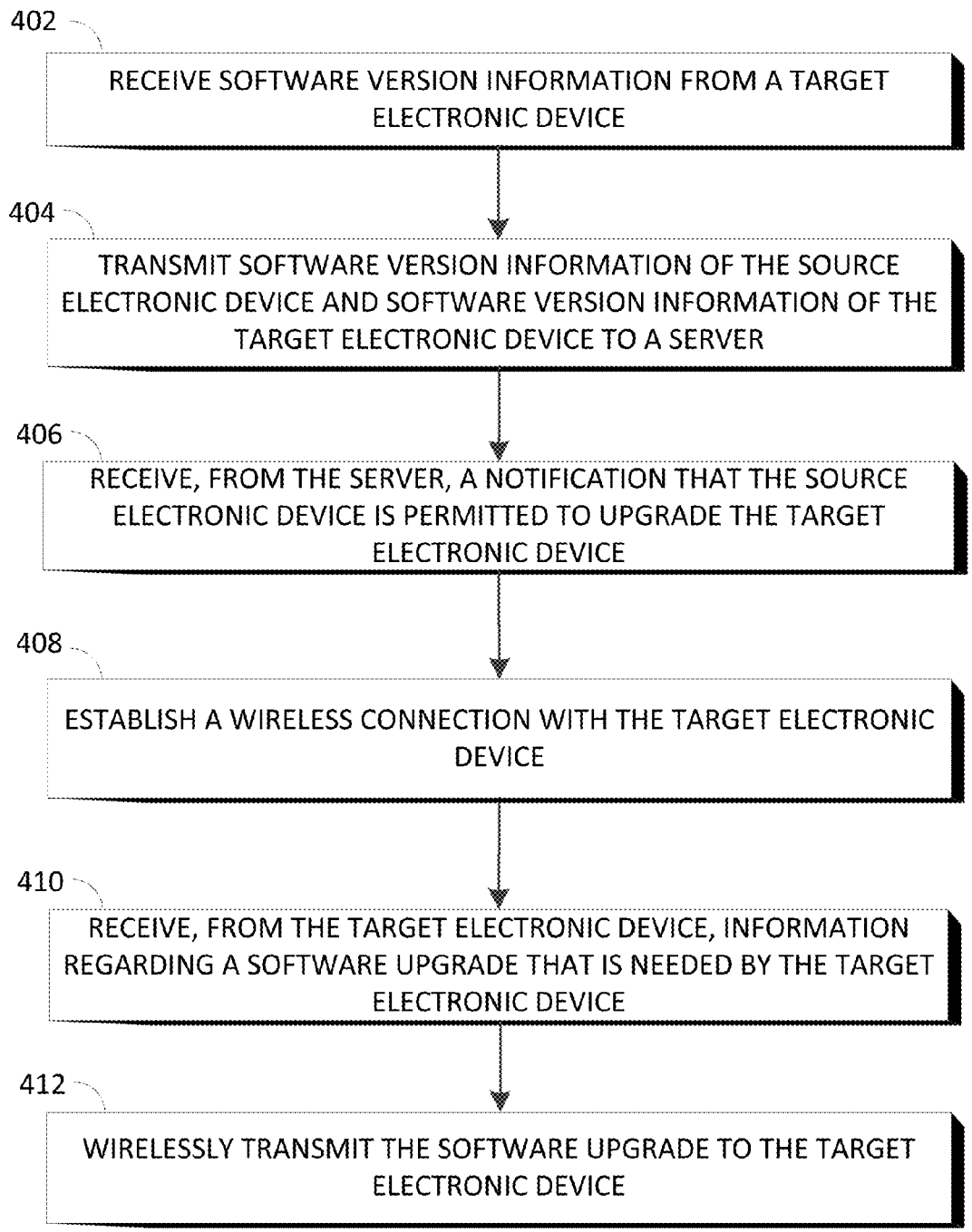

FIG. 4 illustrates a device-to-device software upgrade process 400 carried out by a source electronic device (e.g., the source electronic device 110), according to an embodiment. The source electronic device 110 includes a processor, a memory, and a transceiver, which are communicatively coupled to one another. At step 402, the source electronic device 110 receives software version information from the target electronic device 120. The source electronic device 110 then transmits software version information of the source electronic device 110 and the software version information of the target electronic device 120 to the server 100 at step 404. Then at step 406, the source electronic device 110 receives, from the server 100, a notification that the source electronic device 110 is permitted to upgrade the target electronic device 120. Next, at step 408, the source electronic device 110 establishes a wireless connection with the target electronic device 120. At step 410, the source electronic device 110 receives, from the target electronic device 120, information regarding a software upgrade that is needed by the target electronic device 120. The source electronic device 110 then wirelessly transmits the software upgrade to the target electronic device 120.

In an embodiment, the source electronic device 110 receives a short range communication request from the target electronic device 120 before receiving the In another embodiment, the wireless connection includes a Wi-Fi connection, e.g., a Wi-Fi Direct or Wi-Fi-P2P connection.

In still another embodiment, if the software upgrade includes a monolithic code partition, the source electronic device 110 creates a data dump of the live functioning monolithic code partitions in the source electronic device 110.

In yet another embodiment, if the software upgrade includes a file-system partition, the source electronic device 110 first transmits the file-system partition piecewise to the target electronic device 120. The source electronic device 110 then transmits metadata associated with the file-system partition to the target electronic device 120, where the integrity of the metadata is maintained between the source electronic device 110 and the target electronic device 120.

In an embodiment, the source electronic device 110 is rebooted into recovery mode before establishing the wireless connection with the target electronic device 120.

Figure 5:
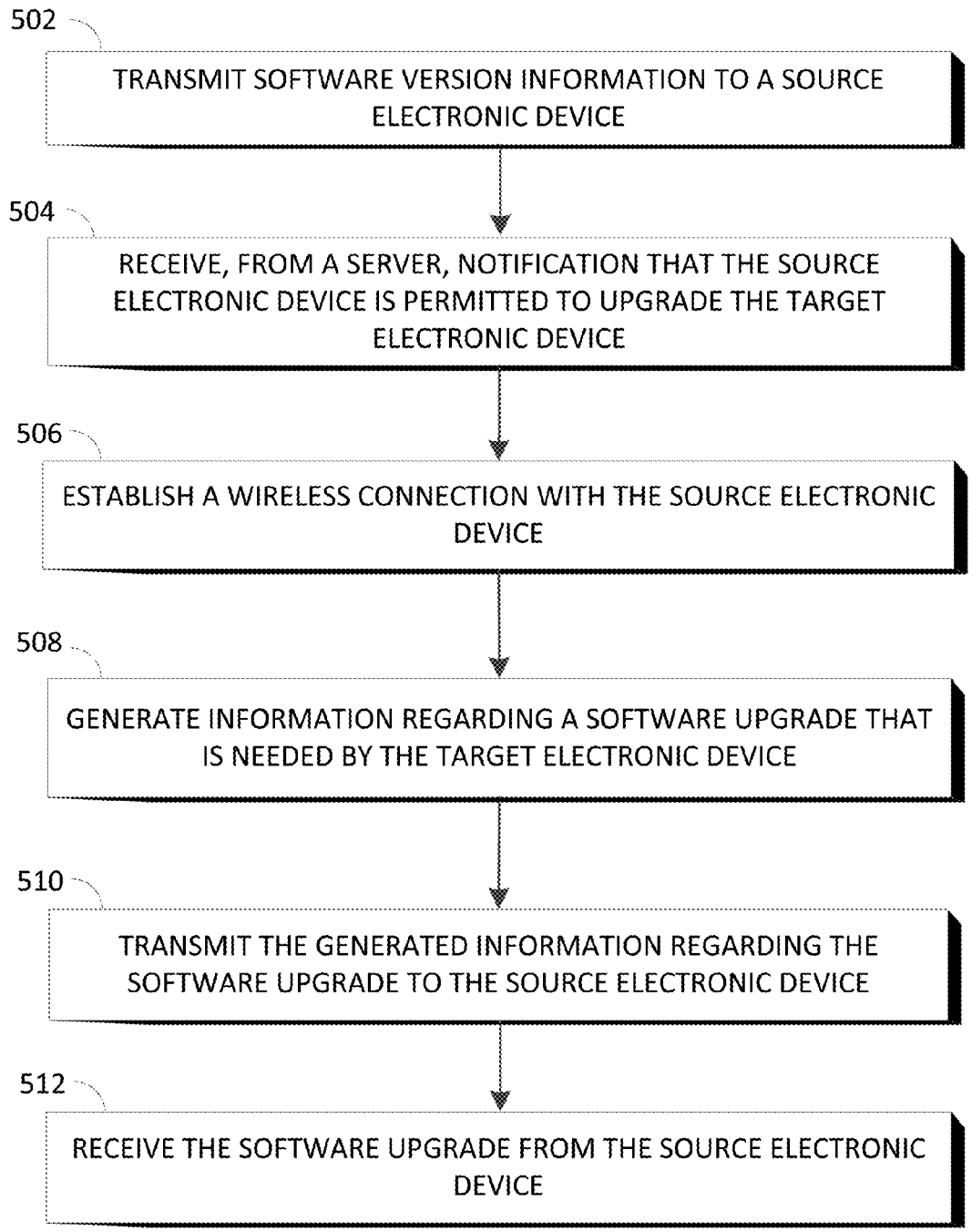

FIG. 5 illustrates a device-to-device software upgrade process 500 carried out by a target electronic device (e.g., the target electronic device 120), according to an embodiment. The target electronic device 120 includes a processor, a memory, and a transceiver, which are communicatively coupled to one another. At step 502, the target electronic device 120 transmits its software version information to the source electronic device 110. The target electronic device 120 then receives, from a server, a notification that the source electronic device 110 is permitted to upgrade the target electronic device 120 at step 504. Next, the target electronic device 120 establishes a wireless connection with the source electronic device 110 at step 506. Then at step 508, the target electronic device 120 generates information regarding a software upgrade that is needed by the target electronic device 120. At step 510, the target electronic device transmits the generated information regarding the software upgrade to the source electronic device 110. Then, at step 512 the target electronic device 120 receives the software upgrade from the source electronic device 110.

In an example, the target electronic device 120 verifies with the server 100 that the received software upgrade can be installed. Upon receiving verification from the server 100 that the received software upgrade can be installed, the target electronic device 120 installs the received software upgrade.

In another example, the target electronic device 120 transmits the status of the software upgrade to the server 100.

In still another example, the target electronic device 120 transmits a short range communication request to the source electronic device 110 before transmitting the software version information. The short range communication request may include IMEI of the target electronic device 120, device identification of the target electronic device 120, and/or MAC address of the target electronic device 120.

In yet another example, the wireless connection includes a Wi-Fi connection, e.g., a Wi-Fi Direct or Wi-Fi-P2P connection.

In an embodiment, the software upgrade includes a monolithic code partition and a file-system partition.

In another embodiment, the target electronic device 120 is rebooted into recovery mode before establishing the wireless connection with the source electronic device 100.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method in a source electronic device, the method comprising:
    receiving software version information from a target electronic device;
    transmitting software version information of the source electronic device and the software version information of the target electronic device to a server;
    receiving, from the server, a notification that the source electronic device is permitted to upgrade the target electronic device;
    establishing a wireless connection with the target electronic device;
    transmitting software partition signature information of the source electronic device to the target electronic device;
    receiving, from the target electronic device, information regarding a software upgrade package that is needed by the target electronic device including needed partitions for performing software upgrade based on differences between software partition signatures of the source and the target device;
    generating, the software upgrade package based on the needed partitions at the source device; and
    wirelessly transmitting the software upgrade package to the target electronic device.

2. The method of claim 1, further comprising:
    receiving a short range communication request from the target electronic device before receiving the software version information.

3. The method of claim 2, wherein the short range communication request comprises a piece of information selected from the group consisting of International Mobile Station Equipment Identity of the target electronic device, device identification of the target electronic device, and media access control address of the target electronic device.

4. The method of claim 1, wherein the wireless connection comprises a Wi-Fi connection.

5. The method of claim 4, wherein the Wi-Fi connection comprises a Wi-Fi direct connection.

6. The method of claim 1, wherein the software upgrade comprises a partition selected from the group consisting of a monolithic code partition and a file-system partition.

7. The method of claim 6, wherein if the software upgrade comprises a monolithic code partition, creating a data dump of the monolithic code partition from partitions stored in the source electronic device.

8. The method of claim 6, wherein if the software upgrade comprises a file-system partition, the method further comprises:
    transmitting the file-system partition piecewise to the target electronic device; and
    transmitting metadata associated with the file-system partition to the target electronic device, wherein integrity of the metadata is maintained between the source electronic device and the target electronic device.

9. The method of claim 1, further comprising:
    rebooting the source electronic device into recovery mode before establishing the wireless connection with the target electronic device.

10. The method of claim 1, wherein the server determines that the source electronic device is permitted to upgrade the target device by performing at least one of the following: checking whether the source electronic device or the target electronic device is a rooted device, verifying international mobile station equipment identity (IMEI) for the source electronic device and the target electronic device, verifying device identification integrity for the source electronic device and the target electronic device, and verifying upgrade path validation.

11. A method in a target electronic device, the method comprising:
    transmitting software version information to a source electronic device;
    communicating with the server to determine if software in the source electronic device is compatible with the target electronic device;

receiving, from a server, a notification that the source electronic device is permitted to upgrade the target electronic device;

establishing a wireless connection with the source electronic device;

receiving software partition signature information from the source electronic device;

generating information regarding a software upgrade that is needed by the target electronic device;

transmitting the generated information regarding the software upgrade to the source electronic device;

receiving from the source electronic device, a software upgrade package that is generated by the source device including needed partitions for performing software upgrade based on differences between software partition signatures of the source and the target device; and executing the software upgrade package at the target electronic device;

wherein the server determines that the source electronic device is permitted to upgrade the target device by performing at least one of the following: checking whether the source electronic device or the target electronic device is a rooted device, verifying international mobile station equipment identity (IMEI) for the source electronic device and the target electronic device, verifying device identification integrity for the source electronic device and the target electronic device, and verifying upgrade path validation.

12. The method of claim 11, further comprising:
verifying with the server that the received software upgrade can be installed, and upon receiving verification from the server that the received software upgrade can be installed, installing the received software upgrade.

13. The method of claim 12, further comprising:
transmitting the status of the software upgrade to the server.

14. The method of claim 11, further comprising:
transmitting a short range communication request to the source electronic device before transmitting the software version information.

15. The method of claim 14, wherein the short range communication request comprises a piece of information selected from the group consisting of International Mobile Station Equipment Identity of the target electronic device, device identification of the target electronic device, and media access control address of the target electronic device.

16. The method of claim 11, wherein the wireless connection comprises a Wi-Fi connection.

17. The method of claim 16, wherein the Wi-Fi connection comprises a Wi-Fi direct connection.

18. The method of claim 11, wherein the software upgrade comprises a partition selected from the group consisting of a monolithic code partition and a file-system partition.

19. The method of claim 11, further comprising:
rebooting the target electronic device into recovery mode before establishing the wireless connection with the source electronic device.

20. A source electronic device comprising:
a memory configured to store software version information of the source electronic device;

and a processor communicatively coupled to the memory and configured to:

control a transceiver to receive software version information from a target electronic device;

transmit software version information of the source electronic device and the software version information of the target electronic device to a server;

receive, from the server, a notification that the source electronic device is permitted to upgrade the target electronic device;

establish a wireless connection with the target electronic device;

transmit software partition signature information of the source electronic device to the target electronic device;

receive, from the target electronic device, information regarding a software upgrade package that is needed by the target electronic device including needed partitions for performing software upgrade based on differences between software partition signatures of the source and the target device;

generate, the software upgrade package based on the needed partitions at the source device; and wirelessly transmit the software upgrade package to the target electronic device.

* * * * *